(12) United States Patent
Suehiro et al.

(10) Patent No.: US 8,564,708 B2
(45) Date of Patent: Oct. 22, 2013

(54) IMAGE DISPLAY DEVICE IMAGE DISPLAY METHOD, STORAGE MEDIUM STORING COMPUTER PROGRAM, AND IMAGE CAPTURE DEVICE

(75) Inventors: Masako Suehiro, Tokyo (JP); Makoto Oishi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 540 days.

(21) Appl. No.: 12/230,843

(22) Filed: Sep. 5, 2008

(65) Prior Publication Data

US 2009/0207296 A1   Aug. 20, 2009

(30) Foreign Application Priority Data

Sep. 27, 2007   (JP) ................................ 2007-252616

(51) Int. Cl.
*H04N 5/222* (2006.01)
*H04N 5/225* (2006.01)

(52) U.S. Cl.
USPC .............. 348/333.01; 348/207.1; 348/333.02; 348/333.05

(58) Field of Classification Search
USPC ............ 348/333.01, 239, 578, 333.05, 207.1, 348/333.02; 386/280, 117
See application file for complete search history.

(56) References Cited

U.S. PATENT DOCUMENTS

| | | | |
|---|---|---|---|
| 5,838,320 A * | 11/1998 | Matthews, III et al. ........ | 715/786 |
| 7,355,620 B2 | 4/2008 | Ikehata et al. | |
| 2001/0000970 A1 * | 5/2001 | Ejima ........................... | 348/232 |
| 2004/0046887 A1 | 3/2004 | Ikehata et al. | |
| 2004/0119868 A1 | 6/2004 | Kim | |
| 2004/0122683 A1 * | 6/2004 | Grossman et al. ................ | 705/1 |
| 2005/0013642 A1 * | 1/2005 | Kawamoto ...................... | 400/62 |
| 2005/0044489 A1 * | 2/2005 | Yamagami et al. ........... | 715/517 |

FOREIGN PATENT DOCUMENTS

| | | |
|---|---|---|
| CN | 1520143 A | 8/2004 |
| CN | 1694483 A | 11/2005 |
| JP | 2002-125190 A | 4/2002 |
| JP | 2003-341172 A | 12/2003 |
| JP | 2004-104594 | 4/2004 |
| JP | 2005-039486 A | 2/2005 |
| JP | 2005-45620 A | 2/2005 |
| JP | 2005-348362 A | 12/2005 |
| JP | 2007-053744 A | 3/2007 |
| JP | 2007-180638 A | 7/2007 |

OTHER PUBLICATIONS

Chinese Office Action dated Apr. 29, 2010, with English translation.
Notice of Reasons for Rejection dated Aug. 16, 2011 (with an English translation).

* cited by examiner

*Primary Examiner* — Joel Fosselman
(74) *Attorney, Agent, or Firm* — McGinn Intellectual Property Law Group, PLLC

(57) ABSTRACT

There are disclosed: an image display device including a storage unit in which a plurality of items of image information are stored; a display unit that performs sequential display, in a predetermined order, of a plurality images represented by the plurality of items of image information; a reception unit that receives a stop instruction for stopping the sequential display; and a controller that controls the display unit such that, when the stop instruction is received by the reception unit during performance of the sequential display, the display unit performs a list display of images within a predetermined range using as a reference an image that is being displayed at a time when the stop instruction is received.

17 Claims, 12 Drawing Sheets

IMAGE DISPLAY DEVICE IMAGE DISPLAY METHOD, STORAGE MEDIUM STORING COMPUTER PROGRAM, AND IMAGE CAPTURE DEVICE

CROSS-REFERENCE TO RELATED APPLICATION

This application claims priority under 35 USC 119 from Japanese Patent Application No. 2007-252616, the disclosure of which is incorporated by reference herein.

BACKGROUND OF THE INVENTION

1. Technical Field

The present invention relates to an image display device, an image display method, a storage medium storing a computer program, and an image capture device which, during performance of sequential (continuous) display of plural images, stopping the sequential display at an arbitrary (any) timing.

2. Related Art

An image display device that performs a sequential display, in a predetermined order, of plural images represented by plural items of image information (data) that are stored in a storage medium is known.

As technology relating to this type of image display device, Japanese Patent Application (Laid-Open) (JP-A) No. 2004-104594 discloses a digital camera that includes various types of playback functions, such as standard playback of moving images, fast-forward playback, rewind playback, slow motion playback, slow motion reverse playback, double speed playback, double speed reverse playback, frame advance playback, and reverse frame advance playback.

However, in the technology disclosed in JP-A No. 2004-104594, there has been a problem that, when a desired image is selected from the images that are being sequentially displayed, sometimes, depending on the display speed, a mismatch occurs between the time when the desired image is being displayed and the time of the designation of the image, and the desired image cannot be exactly selected.

SUMMARY OF THE INVENTION

A first aspect of the present invention provides an image display device including: a storage unit in which a plurality of items of image information are stored; a display unit that performs sequential display, in a predetermined order, of a plurality images represented by the plurality of items of image information; a reception unit that receives a stop instruction for stopping the sequential display; and a controller that controls the display unit such that, when the stop instruction is received by the reception unit during performance of the sequential display, the display unit performs a list display of images within a predetermined range using as a reference an image that is being displayed at a time when the stop instruction is received.

In the image display device according to the first aspect, the display unit performs the sequential display, in a predetermined order, of the plural images represented by the plural items of image information that are stored in the storage unit, and the reception unit receives a stop instruction for stopping the sequential display.

Examples of the storage unit includes a portable recording media, such as a memory stick or a microdrive, and semiconductor memory elements, such as a RAM, an EEPROM or a flash memory.

Further, examples of the display unit includes various types of displays, such as a liquid crystal display (LCD), a CRT display, an organic electroluminescence (EL) display or a plasma display.

In the image display device according to the first aspect of the present invention, the display unit is controlled by the controller such that, when the stop instruction is received by the reception unit during performance of the sequential display, the display unit performs list display of images within a predetermined range using as a reference an image that is being displayed when the stop instruction is received by the reception unit.

In this manner, a desired image can be selected rapidly by selecting the desired image from the images that are being displayed in the list.

The first aspect of the present invention may be configured such that, the images within the predetermined range are a predetermined number of images among display target images in the sequential display in progress, selected consecutively in reverse order of display from the reference image. Thus, even if the time of selecting the desired image later than the time when that image is displayed, the desired image can be selected exactly.

Further, the first aspect of the present invention may be configured such that, the images within the predetermined range are a predetermined number of images among display target images in the sequential display in progress, selected consecutively in order of display from the reference image. Thus, even if the time of selecting the desired image is faster than the time when that image is displayed, the desired image can be selected exactly.

Further, the first aspect of the present invention may be configured such that, the images within the predetermined range include a second and a third predetermined number of images among display target images in the sequential display in progress, the second predetermined number of images being selected consecutively in reverse order of display from the reference image and the third predetermined number of images selected consecutively in order of display from the reference image. Thus, even if the time of selecting the desired image is either earlier or later than the time when the image is displayed, the desired image can be selected exactly.

Further, the first aspect of the present invention may be configured such that, the controller controls the display unit such that the images within the predetermined range that are displayed as the list display are disposed in a tiled layout. Thus, a desired image can be selected even more quickly.

Further, the first aspect of the present invention may be configured such that, the controller controls the display unit such that the display unit performs the list display by displaying, within a predetermined region within a display region of the display unit, a predetermined number of images that are display targets, and such that, when the number of the display target images is less than the predetermined number, the display unit enlarges the display target images and displays them utilizing an empty region within the predetermined region. Thus, a desired image can be selected even more quickly.

Further, the first aspect of the present invention may be configured such that, the controller controls the display unit such that the display unit performs the list display by displaying, within a predetermined region within a display region of the display unit, a predetermined number of images that are display targets, and such that, when the number of the display target images is less than the predetermined number, the display unit displays no image on an empty region within the predetermined region. Thus, a desired image can be selected even more quickly.

Further, the first aspect of the present invention may be configured such that, the display unit performs the sequential display by displaying by frame advance, in the predetermined order, a plurality of images among images which are display targets. Thus, a desired image can be selected even more quickly.

Further, the first aspect of the present invention may be configured such that, the reception unit further receives a predetermined instruction, and the controller controls the display unit such that, when the predetermined instruction has not been received by the reception unit within a predetermined amount of time after the display unit performs the list display, the display unit returns a display state of the display unit to a state in which the stop instruction was received by the reception unit. Thus, an operation for displaying again the image that has been displayed at the time when the stop instruction is received is unnecessary and, which can improve convenience of a user.

Further, the first aspect of the present invention may be configured such that, the reception unit further receives, when at least one image is being displayed by the display unit, a start instruction for starting the sequential display in the predetermined order beginning with the at least one image, and the controller controls the display unit such that the display unit performs the sequential display when the start instruction is received by the reception unit. Thus, the sequential display can be started at an arbitrary time and, which can improve convenience of a user.

A second aspect of the present invention provides an image display method including: storing a plurality of items of image information respectively representing a plurality of images; sequentially displaying the plurality of images in a predetermined order; receiving a stop instruction for stopping the sequential display; and controlling such that, when the stop instruction is received while the sequential display is being performed, a list display of images within a predetermined range is displayed using as a reference an image that is being displayed when the stop instruction is received.

A third aspect of the present invention provides a storage medium storing a program for causing a computer to execute an image displaying processing, the processing including: storing a plurality of items of image information respectively representing a plurality of images; sequentially displaying the plurality of images in a predetermined order; receiving a stop instruction for stopping the sequential display; and controlling such that, when the stop instruction is received while the sequential display is being performed, a list display of images within a predetermined range is displayed using as a reference an image that is being displayed when the stop instruction is received.

A fourth aspect of the present invention provides an image capture device including the image display device according the first aspect of the present invention.

BRIEF DESCRIPTION OF THE DRAWINGS

Exemplary embodiments of the present invention will be described in detail based on the following figures, wherein.

DETAILED DESCRIPTION OF THE INVENTION

Below, exemplary embodiments implementing the present invention will be described in detail with reference to the drawings. Noted that in each of the following exemplary embodiments, a case will be described where the present invention is applied to a digital electronic still camera (below, referred to as "digital camera").

First Exemplary Embodiment

Figure 1:
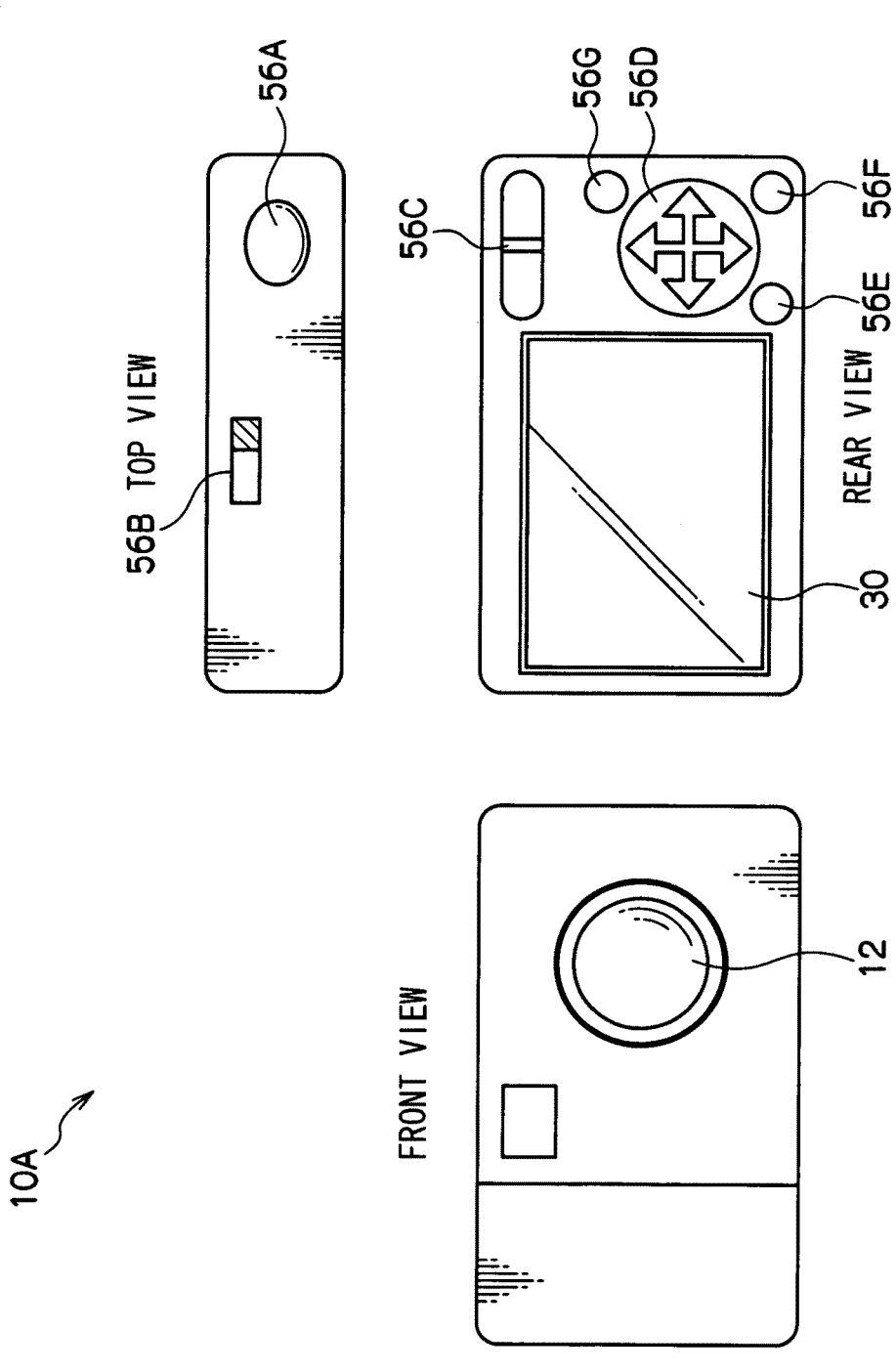
FIG. 1 is an appearance diagram showing an appearance of a digital camera of a first exemplary embodiment.

FIG. 1 is an appearance diagram showing an appearance of a digital camera 10A of a first exemplary embodiment.

As shown in FIG. 1, a lens 12 for imaging a subject is disposed on the front surface of the digital camera 10A, which functions as an image display device and an image capture device of the exemplary embodiment invention. A release button (a so-called shutter) 56A that are pressed by a photographer when executing an image capture and a power switch 56B are disposed on the top surface of the digital camera 10A.

It will be noted that the release button 56A of the first exemplary embodiment is configured such that two stages of pressing, i.e., a state where the release button 56A is pressed to an intermediate position (hereinafter, referred to as "half-pressed state") and a state where the release button 56A is pressed to a final pressing position past the intermediate position (hereinafter, referred to as "full-pressed state"), are detectable.

In the digital camera 10A of the first exemplary embodiment, an automatic exposure (AE) function works when the release button 56A is pressed in the half-pressed state whereby the exposure state (shutter speed, state of aperture) is set. Then an auto focus (AF) function works and focusing is performed, and thereafter an exposure (image capture) is performed by the release button 56A subsequently being pressed in the full-pressed state.

A liquid crystal display (hereinafter, referred to as "LCD") 30, a mode switch 56C, and a cross cursor button 56D are disposed on the rear surface of the digital camera 10A. The LCD 30 displays subject images (images) represented by digital image data that is obtained by an image capture, various types of menu screens and messages. The mode switch 56C can be slidingly operated in order to set the camera into either an image capture mode for performing an image capture or a playback mode for displaying (playing-back) on the LCD 30 images represented by the digital image data that is obtained by the image capture. The cross cursor button 56D is configured to include four arrow keys representing four moving directions of up, down, left and right in a display region of the LCD 30.

Further, a menu key 56E that is pressed for displaying a main menu screen on the LCD 30, an execution key 56F that is pressed for executing processing that is designated on the menu screen, and a cancel key 56G that is pressed for stopping (canceling) various types of operations are disposed on the rear surface of the digital camera 10A.

Figure 2:
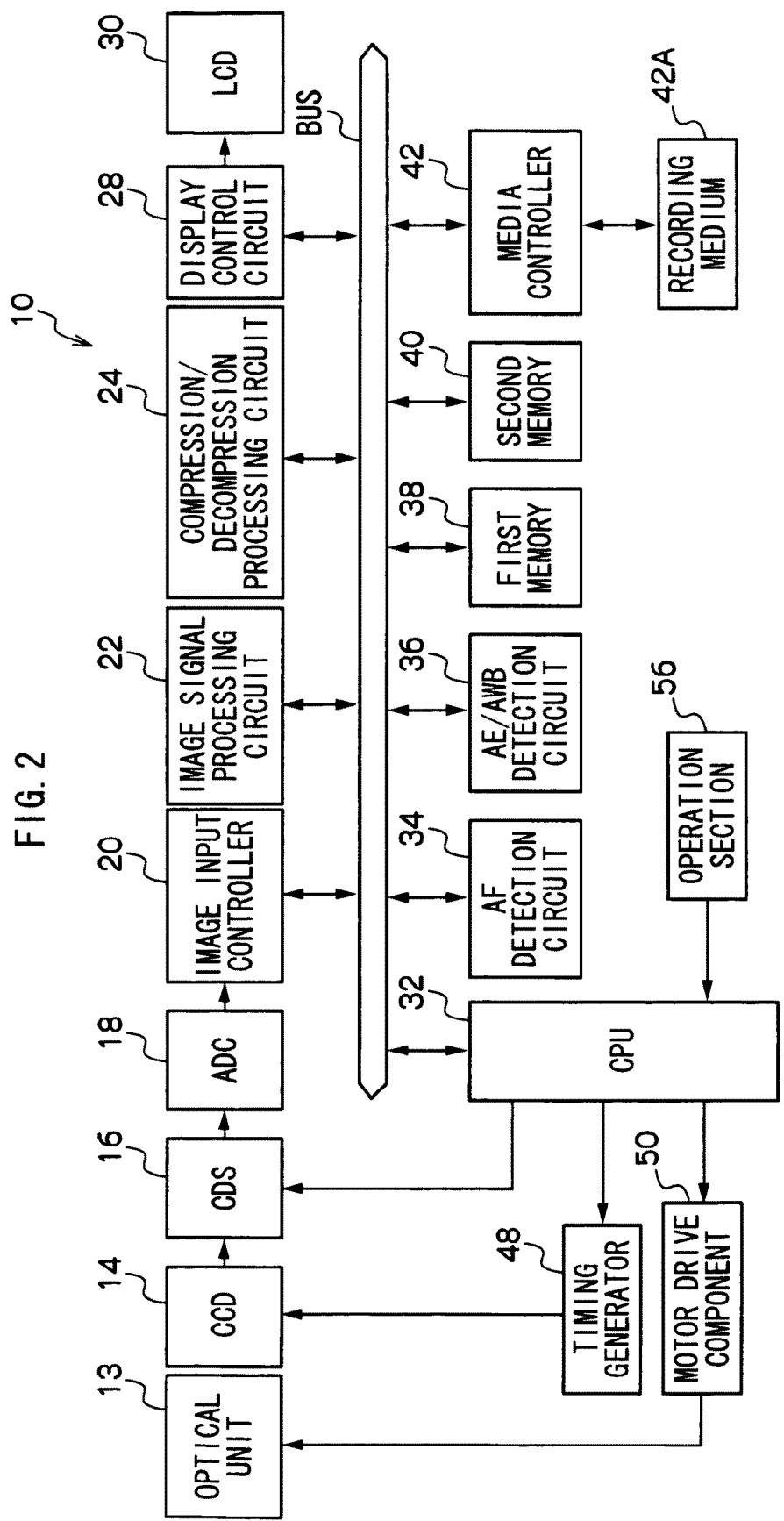
FIG. 2 is a block diagram showing a configuration of relevant electrical components of the digital camera of the first exemplary embodiment.

FIG. 2 is a block diagram showing the configuration of essential electrical configuration of the digital camera 10A of the first exemplary embodiment.

As shown in FIG. 2, the digital camera 10A includes an optical unit 13 that includes the aforementioned lens 12, a CCD 14 that is disposed behind the lens 12 along the optical axis thereof, a correlated double sampling circuit (referred to as a "CDS") 16, and an analog/digital converter (referred to as an "ADC") 18 that converts inputted analog signals into digital data. The output terminal of the CCD 14 is connected to the input terminal of the CDS 16, and the output terminal of the CDS 16 is connected to the input terminal of the ADC 18.

The correlated double sampling processing preformed by the CDS 16 is a processing that obtains, in order to reduce noise (particularly thermal noise) included in output signals of a solid image capture element, accurate image data by calculating, for each pixel, the difference between a feedthrough component level and a pixel signal component level included in the output signals of the solid imaging element.

The digital camera 10A is also configured to include an image input controller 20, an image signal processing circuit 22, a compression/decompression processing circuit 24, and a display control circuit 28. The image input controller 20 includes a line buffer of a predetermined capacity and performs control for directly storing inputted digital image data in a predetermined region of a later-described second memory 40. The image signal processing circuit 22 performed various types of image processing with respect to digital image data. The compression/decompression processing circuit 24 performs a compression processing to digital image data in a predetermined compression format and a decompression processing to the compressed digital image data. The display control circuit 28 generates signals for causing the LCD 30 to display images represented by the digital image data and menu screens and supplies the signals to the LCD 30. The input terminal of the image input controller 20 is connected to the output terminal of the ADC 18.

Further, the digital camera 10A is configured to include a central processing unit (CPU) 32 that controls operation of the entire digital camera 10A, an AF detection circuit 34, an AE/AWB detection circuit 36, a first memory 38, and a second memory 40. The AF detection circuit 34 detects a physical quantity (in the first exemplary embodiment, an AF evaluation value that represents a high-frequency component of the brightness of an image obtained by the image capture by the CCD 14) that is required in order to cause the AF function to work. The AE/AWB detection circuit 36 detects a physical quantity (in the exemplary embodiment, a quantity that represents the brightness of an image obtained by the image capture by the CCD 14) that is required in order to cause the AE function and an automatic white balance (AWB) function to work. The first memory 38 is used as a work area and the like during execution of various types of processing by the CPU 32. The second memory 40 mainly stores digital image data obtained by the image capture.

Moreover, the digital camera 10A includes a media controller 42 for enabling a recording medium 42A to be accessible by the digital camera 10A.

The image input controller 20, the image signal processing circuit 22, the compression/decompression processing circuit 24, the display control circuit 28, the CPU 32, the AF detection circuit 34, the AE/AWB detection circuit 36, the first memory 38, the second memory 40 and the media controller 42 are all interconnected via a bus.

Consequently, the CPU 32 can respectively perform operation controls of each of the image input controller 20, the image signal processing circuit 22, the compression/decompression processing circuit 24 and the display control circuit 28, acquisitions of the physical quantities detected by the AF detection circuit 34 and the AE/AWB detection circuit 36, accesses to the first memory 38 and the second memory 40, and an access to the recording medium 42A via the media controller 42.

A timing generator 48 that generates and supplies a timing signal to the CCD 14 for driving the CCD 14 is further provided in the digital camera 10A. The input terminal of the timing generator 48 is connected to the CPU 32, the output terminal of the timing generator 48 is connected to the CCD 14. Thereby, the driving of the CCD 14 is controlled by the CPU 32 via the timing generator 48.

The CPU 32 is connected to the input terminal of a motor drive section 50, and the output terminals of the motor drive section 50 are connected to a focus adjusting motor, a zoom motor and an aperture driving motor that are disposed in the optical unit 13.

The lens 12 that is included in the optical unit 13 of the first exemplary embodiment includes plural lenses, and is configured as a zoom lens whose focal distance is variable (can be magnified). The lens 12 is provided with an unillustrated lens drive mechanism. The focus adjusting motor, the zoom motor and the aperture driving motor are included in this lens drive mechanism, and the focus adjusting motor, the zoom motor and the aperture driving motor are driven by drive signals supplied from the motor drive section 50 under the control of the CPU 32.

In order to change an optical zoom magnification factor, the CPU 32 drives and controls the zoom motor to change the focal distance of the lens 12 that is included in the optical unit 13.

Further, the CPU 32 performs focus control by driving and controlling the focus adjusting motor such that the contrast of an image obtained by the image capture by the CCD 14 to be maximum. That is, in the digital camera 10A of the first exemplary embodiment, a so-called through-the-lens (TTL) system that sets the position of the lens such that the contrast of an image that is read to be maximum is employed for a focus controlling.

Moreover, operation section 56 that include the aforementioned release button 56A, the power switch 56B, the mode switch 56C, the cross cursor button 56D, the menu key 56E, the execution key 56F and the cancel key 56G are connected to the CPU 32, and the CPU 32 can continuously recognize the operating state with respect to the each components of the operation section 56.

Next, an operation of the digital camera 1 OA of the first exemplary embodiment will be described. First, a flow of overall processing when the image capture mode is set will be briefly described.

First, an image capture is performed by the CCD 14 via the optical unit 13, and signals representing an image are sequentially outputted from the CCD 14. Then, the signals outputted from the CCD 14 are sequentially inputted to the CDS 16, wherein the correlated double sampling processing is performed to the signals, thereafter the signals are inputted to the ADC 18. The ADC 18 converts the signals of red (R), green (G) and blue (B) inputted from the CDS 16 into 12-bit signals of R, G and B (digital image data) and outputs the digital image data to the image input controller 20.

The image input controller 20 stacks the digital image data sequentially inputted from the ADC 18 in the line buffer built in the image input controller 20 and temporarily stores the digital image data in a predetermined region of the second memory 40.

The digital image data stored in the predetermined region of the second memory 40 is read by the image signal processing circuit 22 under control by the CPU 32, white balance adjustment is performed by applying to the digital image data a digital gain corresponding to a physical quantity that is detected by the AE/AWB detection circuit 36, and gamma processing and sharpness processing are performed to generate 8-bit digital image data. Further, YC signal processing is performed to generate a brightness signal Y and chroma signals Cr and Cb (hereinafter referred to as "YC signals"), and the YC signals are stored in a region of the second memory 40 that is different from the predetermined region.

The LCD 30 is configured as a display that can be used as a finder by displaying a moving image (a through image) obtained by sequential image capture by the CCD 14. When the LCD 30 is used as a finder in this manner, the generated YC signals are sequentially outputted to the LCD 30 via the display control circuit 28. Thus, a through image can be displayed on the LCD 30.

Here, when the release button 56A is pressed to the half-pressed state by a user, the AE function works to set the exposure state as mentioned before, and the AF function to control focusing. Thereafter, when the release button 56A is pressed to the full-pressed state, the YC signals stored in the second memory 40 at this time are compressed in a predetermined compression format (in the first exemplary embodiment, a JPEG format) by the compression/decompression processing circuit 24 and then stored in the recording medium 42A as image information. This image information represents the image that is obtained by the image capture. An image number for identifying the image is added to the image information.

In the digital camera 10A of the first exemplary embodiment, when plural items of image information are recorded in the recording medium 42A, the image numbers are assigned such that, each time image information is recorded in the recording medium 42A, an image number is assigned in ascending order using the first item of image information that is recorded in the recording medium 42A as a reference.

In the digital camera 10A of the first exemplary embodiment, in a case in which plural items of image information are recorded at the recording medium 42A, during a state in which an image represented by at least one of the plural items of image information is being displayed by the LCD 30 in the playback mode, when a start instruction for starting sequential display of the plural images in a predetermined order starting from the displayed image is received by the operation section 56, the CPU 32 performs high-speed frame advance processing that causes the LCD 30 to perform the sequential display.

In the digital camera 10A of the first exemplary embodiment, continuous pressing, for a period equal to or greater than a predetermined amount of time (in the first exemplary embodiment, for example, one second), of the arrow key corresponding to the left direction or the right direction of the cross cursor button 56D can be used as the start instruction.

Next, an operation of the digital camera 10A will be described with reference to FIG. 3. Here, in order to avoid confusion, a case will be described where the playback mode is set and plural items of information are recorded in the recording medium 42A.

Figure 3:
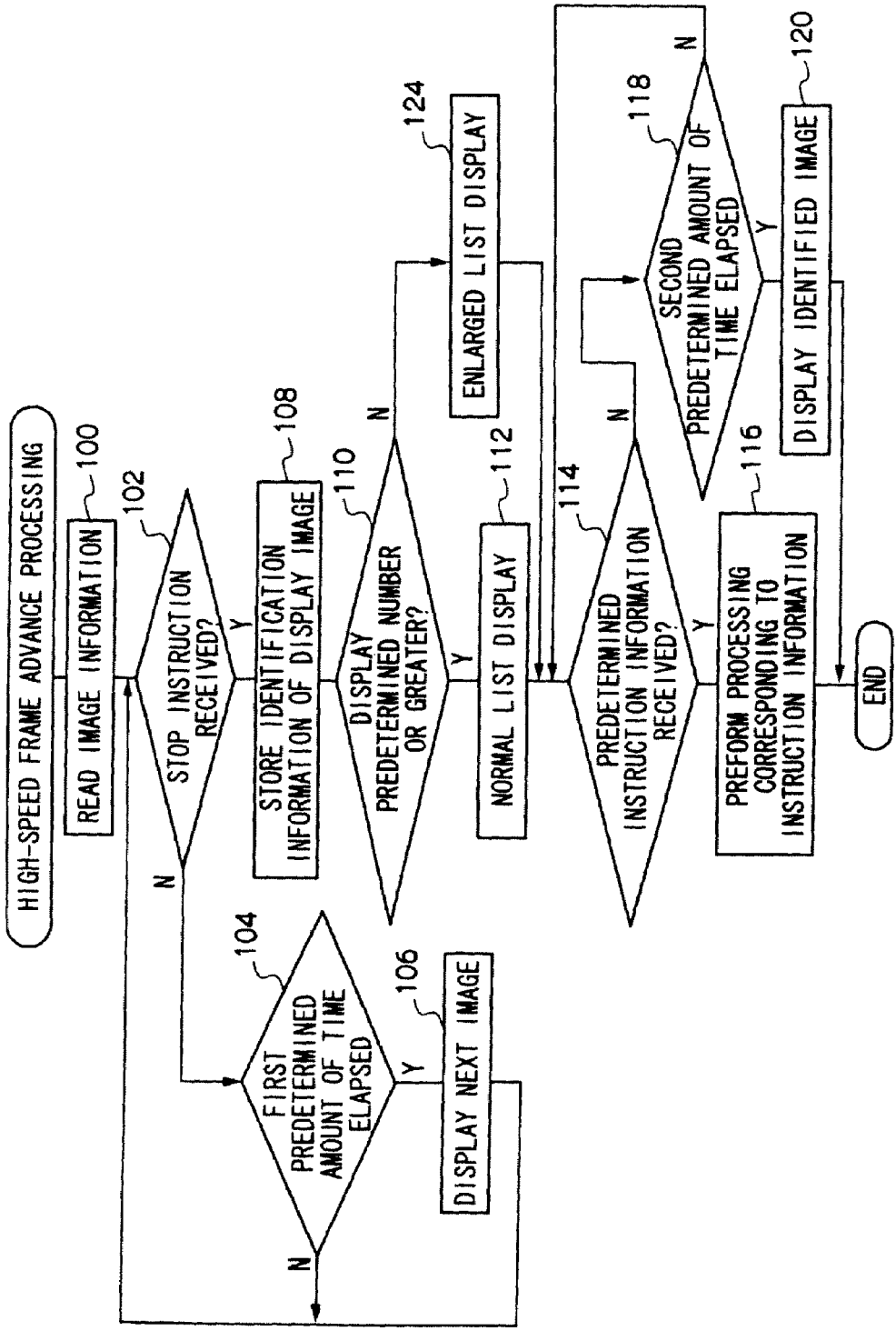
FIG. 3 is a flowchart showing a flow of processing of a high-speed frame advance processing program of the first exemplary embodiment.

FIG. 3 is a flowchart showing a flow of processing of a high-speed frame advance processing program of the first exemplary embodiment that is executed by the CPU 32 of the digital camera 10A in response to the start instruction. This program is stored in advance in a predetermined region of the second memory 40.

In step 100 of FIG. 3, all of the items of image information that are recorded in the recording medium 42A are read out. In the next step 102, it is determined whether or not a stop instruction for stopping the sequential display is received by the operation section 56. When the determination is affirmative, then the process proceeds to step 108. When the determination is negative, then the process proceeds to step 104.

In the digital camera 10A of the first exemplary embodiment, releasing of the cross cursor button 56D is used as the stop instruction.

In step 104, it is determined whether or not a first predetermined amount of time (in the first exemplary embodiment, 0.1 second for example) is elapsed after the processing of step 102 is performed. When the determination is affirmative, then the step moves to step 106. When the determination is negative, then the step returns to step 102.

It will be noted that, in the digital camera 1 OA of the first exemplary embodiment, 0.1 second is applied as the first predetermined amount of time, but this amount of time is appropriately alterable.

In step 106, an image having a next display order of the image which is currently being displayed is displayed. Thereafter, the step returns to step 102.

In the digital camera 10A of the first exemplary embodiment, for example, items of the image information having the image numbers of "1" to "10" can be recorded in the recording medium 42A in ascending order beginning with the image information having the image number of "1", and the image number assigned to the item of image information representing the image currently being displayed on the LCD 30 may be "10". In this case, when the arrow key representing the left direction of the cross cursor button 56D is pressed as the start instruction and the processing of step 102 to step 106 is repeatedly performed, the images having the image numbers of "1" to "10" are sequentially and repeatedly displayed using the image having the image number of "10" as a starting point and using the image having the image number of "1" as an ending point, until the stop instruction is received by the operation section 56.

Alternately, in the digital camera 10A of the first exemplary embodiment, for example, items of image information having the image numbers of "1" to "10" can be recorded in the recording medium 42A in ascending order beginning with the item of image information having the image number of "1" and the image number assigned to the item of image information representing the image currently being displayed may be "1". In this case, when the arrow key representing the right direction of the cross cursor button 56D is pressed and the processing of step 102 to step 106 is repeatedly performed, the images having the image numbers of "1" to "10" are sequentially and repeatedly displayed using the image having the image number of "1" as a starting point and using the image having the image number of "10" as an ending point, until the stop instruction is received by the operation section 56.

In step 108, information (here, the image number) for identifying the image currently being displayed on the LCD 30 is stored in the second memory 40. In the next step 110, it is determined whether or not a predetermined number of images (here, nine) or greater have been displayed by the processing of step 102 to step 106. When the determination is affirmative, then the step moves to step 112. When the determination is negative, then the step moves to step 124.

In step 112, the LCD 30 performs a normal list display of the images within a predetermined range using as a reference the image that is being displayed when the stop instruction is received by the processing of step 102. Thereafter the step moves to step 114.

In the digital camera 10A of the first exemplary embodiment, the image being displayed at a time when the stop instruction is received in the processing of step 102, and a predetermined number (here, eight) of images that are the display targets of the sequential display and are selected consecutively in reverse order of display from the displayed image, are used as the images within the predetermined range.

Here, in the digital camera 10A of the first exemplary embodiment, in the processing of step 122, the LCD 30 displays, within a predetermined region within the display region of the LCD 30, the predetermined number of images of the display targets.

Figure 4:
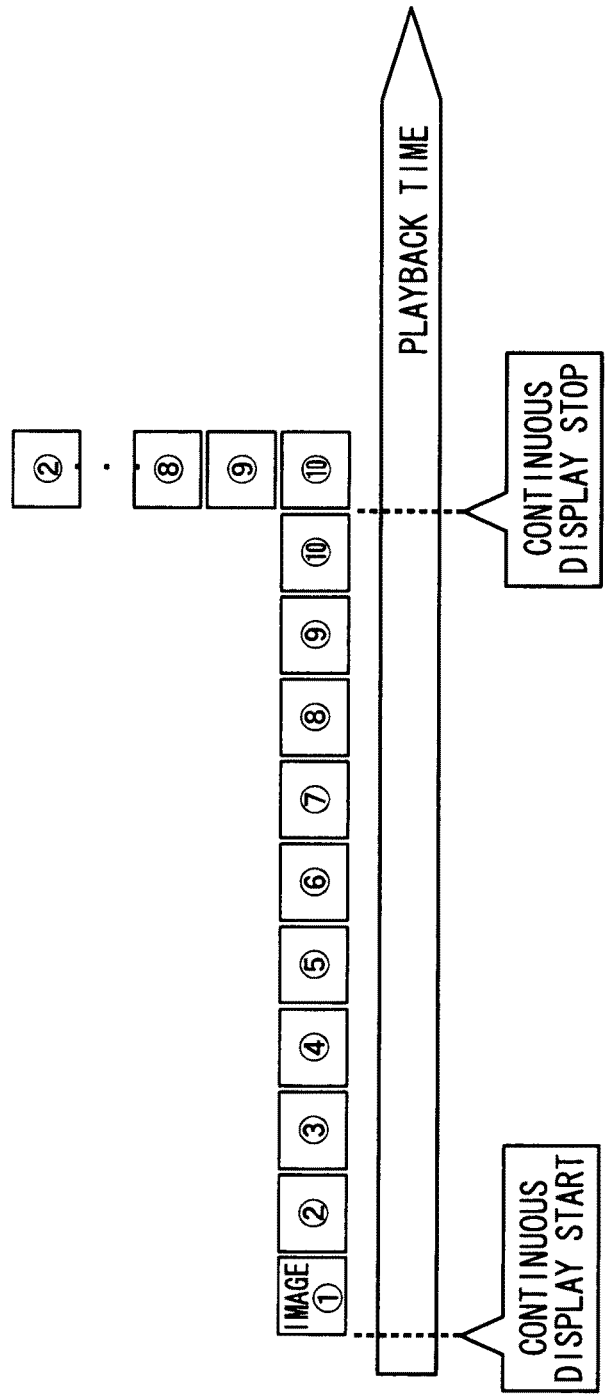
FIG. 4 is a schematic diagram showing display target images in a time series order when performing a sequential display in the digital camera of the first exemplary embodiment.
Figure 5:
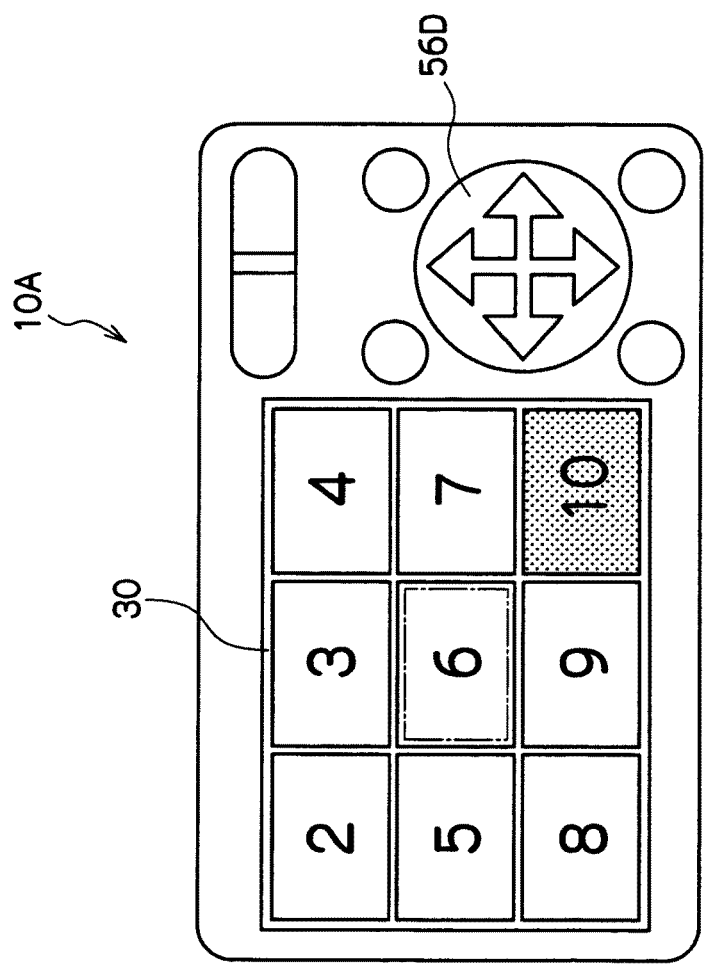
FIG. 5 is a schematic diagram showing an example of a list display in the digital camera of the first exemplary embodiment.

For example, as shown in FIG. 4, items of image information having the image numbers of "1" to "10" may be recorded in the recording medium 42A in ascending order beginning with the image information having the image number of "1", and the sequential display may be started from the image information having the image number "1" and the sequential display may be stopped at a time when the image represented by the image information having the image number "10" is being displayed. In this case, in the processing of step 112, as shown in FIG. 5, the LCD 30 is caused to list-display, in a tiled layout in nine divided regions (sections) formed by equally trisecting the vertical side and the horizontal side of the display region of the LCD 30, thumbnail images of the images represented by the items of image information having the image numbers of "2" to "10". The images are lined up in ascending order of the image numbers from the top left section to the bottom right section (the hatched region in FIG. 5) of the display region of the LCD 30 when seen from the front of the LCD 30, and one image is displayed in each one of the sections.

Although numbers in the display region of the LCD 30 shown in FIG. 5 represent the image numbers, the image numbers will. not actually be displayed.

Further, in the digital camera 10A of the first exemplary embodiment, a user may select any one of the sections, and a selection frame (indicated by a one-dotted chain line in FIG. 5) is displayed in the position of the section of the LCD 30 that is selected by the user. The selection frame can be moved by a user with operating the cross cursor button 56D. When the user presses the execution key 56F after stopping the movement of the selection frame, the image selected by the selection frame at that time is enlarged and displayed on the entire display region of the LCD 30.

In step 114, it is determined whether or not predetermined instruction information (instruction) has been received by the operation section 56. When the determination is affirmative, then the step moves to step 116. When the determination is negative, then the step moves to step 118.

In step 116, processing corresponding to the instruction that has been received in the processing of step 114 is performed. Thereafter, the high-speed frame advance processing program of the first exemplary embodiment ends. Examples of the processing corresponding to the instruction include moving the selection frame, displaying a menu screen, and erasing image information corresponding to an image selected by the selection frame.

In step 118, it is determined whether or not a second predetermined amount of time (in the first exemplary embodiment, for example, twenty seconds) has elapsed after the list display has been performed in the processing of step 112. When the determination is affirmative, then the step moves to step 120. When the determination is negative, then the step returns to step 114.

In the digital camera 10A of the first exemplary embodiment, the second predetermined amount of time is set to twenty seconds, but this amount of time can be appropriately changed.

In step 120, the LCD 30 displays the image identified by the image number that is stored in the second memory 40 in the processing of step 108 such that the display state of the LCD 30 returns to the state when the stop instruction was received by the operation section 56. Thereafter, the high-speed frame advance processing program of the first exemplary embodiment ends.

On the other hand, in step 124, the LCD 30 performs the list display by enlarging and displaying the images of the display targets utilizing an empty region within the predetermined region. Thereafter, the high-speed frame advance processing program of the first exemplary embodiment ends.

Figure 6:
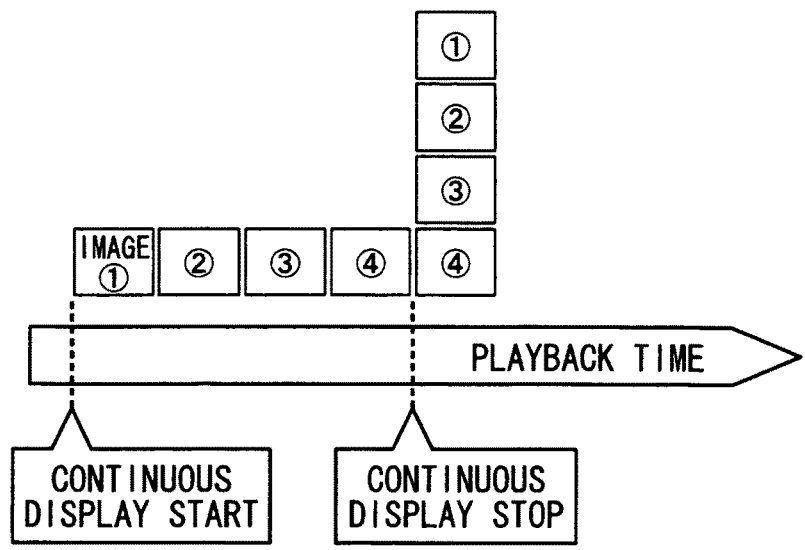
FIG. 6 is a schematic diagram showing display target images in another time series order when performing a sequential display in the digital camera of the first exemplary embodiment.

In the digital camera 10A of the first exemplary embodiment, for example, as shown in FIG. 6, items of image information having the image numbers of "1" to "4" may be recorded in the recording medium 42A in ascending order beginning from the image information having the image number "1", and the sequential display may be started from the image information having the image number "1" and the sequential display may be stopped at a time when the image represented by the image information having the image number "4" is being displayed. In this case, in the processing of step 124, as shown in FIG. 7, the LCD 30 may perform the list display by enlarging the images represented by the items of image information having the image numbers of "1" to "4" utilizing an empty region in the sections.

The images represented by the items of image information having the image numbers of "1" to "4" are list-displayed in a tiled layout such that the image having the image number "4" is displayed in the bottom right region (the hatched region in FIG. 7) of the display region of the LCD 30 when seen from the front of the LCD 30, and such that the imaged are lined up in ascending order of the image numbers from the top left to the bottom right of the display region of the LCD 30.

Figure 7:
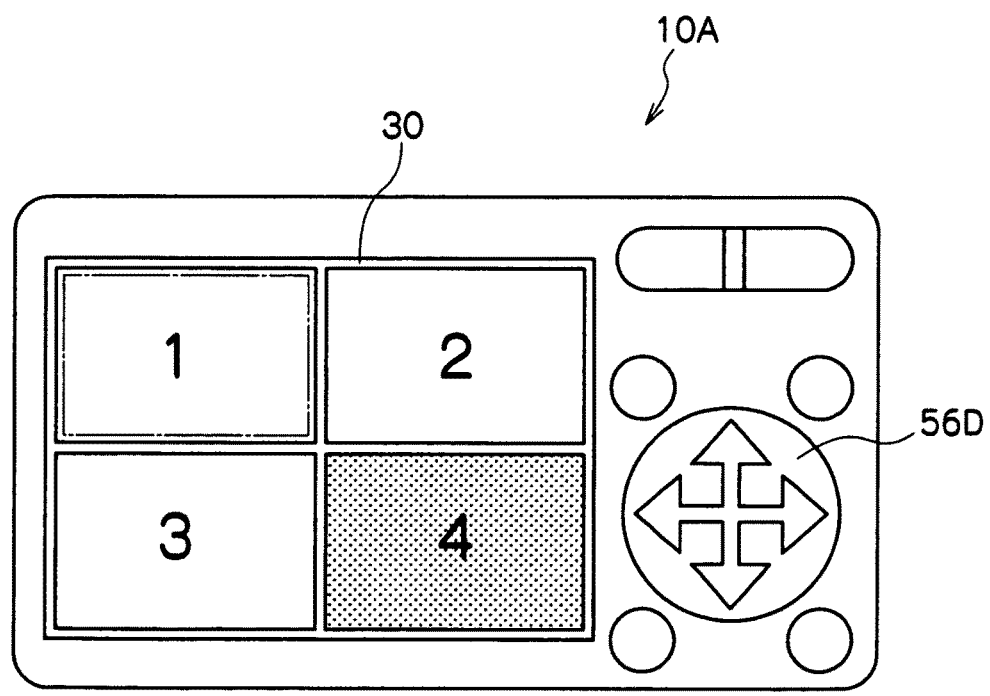
FIG. 7 is a schematic diagram showing another example of a list display in the digital camera of the first exemplary embodiment.

Further, the frame represented by the one-dotted chain line in FIG. 7 is a selection frame for selecting an image displayed on the LCD 30 and can be used in the same manner as that of the aforementioned selection frame.

Further, although the numbers in the display region of the LCD 30 shown in FIG. 7 represent image numbers, the image numbers will not actually be displayed.

It will be noted that, in the first exemplary embodiment, the step 102 corresponds to the reception step of the present invention, the steps 102 to 106 correspond to the display step of the present invention, and steps 112 and 124 correspond to the control step of the present invention.

As described in detail above, according to the first exemplary embodiment, plural items of image information may be recorded in the recording medium 42A, and the LCD 30 performs sequential display, in a predetermined order (in the first exemplary embodiment, image number order), of plural images represented by the recorded plural items of image information. The operation section 56 may receive a stop instruction for stopping the sequential display. When the stop instruction is received by the operation section 56 during performance of the sequential display, the CPU 32 may control the LCD 30 to a list display of images with a predetermined range using as a reference an image that is being displayed at a time when the stop instruction is received. Thus, a desired image can be easily selected.

Further, according to the first exemplary embodiment, the predetermined range of images may be a predetermined number (in the first exemplary embodiment, eight) of images among images to be display targets in the corresponding sequential display, selected consecutively in reverse order of display from the reference image. Thus, even if the time of selecting a desired image is later than the time when that image is displayed, the desired image can be selected quickly.

Further, according to the first exemplary embodiment, the CPU 32 controls the LCD 30 to list-display, in a tiled layout, the images with in the predetermined range (i.e., the predetermined number of images among the images of the display targets in the sequential display in progress, selected consecutively in reverse order of display from the reference image). Thus, a desired image can be selected even more quickly.

According to the first exemplary embodiment, the CPU 32 controls the LCD 30 to perform the list display that displaying, within a predetermined region in a display region of the LCD 30, a predetermined number (here, nine) of the images of the display targets. Further, when the number of the images of the display targets is less than the predetermined number, the LCD 30 enlarges the images of the display targets by utilizing an empty region within the predetermined region. Thus, a desired image can be selected even more quickly.

According to the first exemplary embodiment, the operation section 56 may receive a predetermined instruction (here, predetermined instruction information). The CPU 32 controls the LCD 30 such that, when the predetermined instruction has not been received by the operation section 56 within a second predetermined amount of time (here, twenty seconds) from the time when the list display is performed, the LCD 30 returns its display state to the state when the stop instruction was received by the operation section 56. Thus, an operation for displaying again the image that had been displayed at the time when the stop instruction was received becomes unnecessary, which can improve convenience of a user.

According to the first exemplary embodiment, the operation section 56 receives, in a state in which an image represented by at least one of the plural items of image information that are recorded in the recording medium 42A is being displayed by the LCD 30, a start instruction for starting a sequential display in a predetermined order beginning from that image. When the start instruction is received by the operation section 56 the CPU 32 then controls the LCD 30 such that the LCD 30 performs the sequential display. Thus, the sequential display can be started at any time, which may improve convenience of a user.

In the first exemplary embodiment, the images within the predetermined range correspond to a predetermined number of images among the images of the display targets in the sequential display in progress, which are selected consecutively in reverse order of display from the reference image. However, the exemplary embodiment is not limited to this. The images within the predetermined range may also be a predetermined number of images among the display targets in the sequential display in progress, which are selected consecutively in order of display from the reference image. In this case, even if the time of the selection of a desired image is earlier than the time when that image is displayed, the desired image can be selected exactly.

Further, in this case, the CPU 32 may also be configured to control to the LCD 30 to perform the list display by displaying, in a tiled layout, the above predetermined range of images (the predetermined number of images that are the display targets in the sequential display in progress and are selected consecutively in order of display from the reference image). Thus, a desired image can be selected even more exactly.

Figure 8:
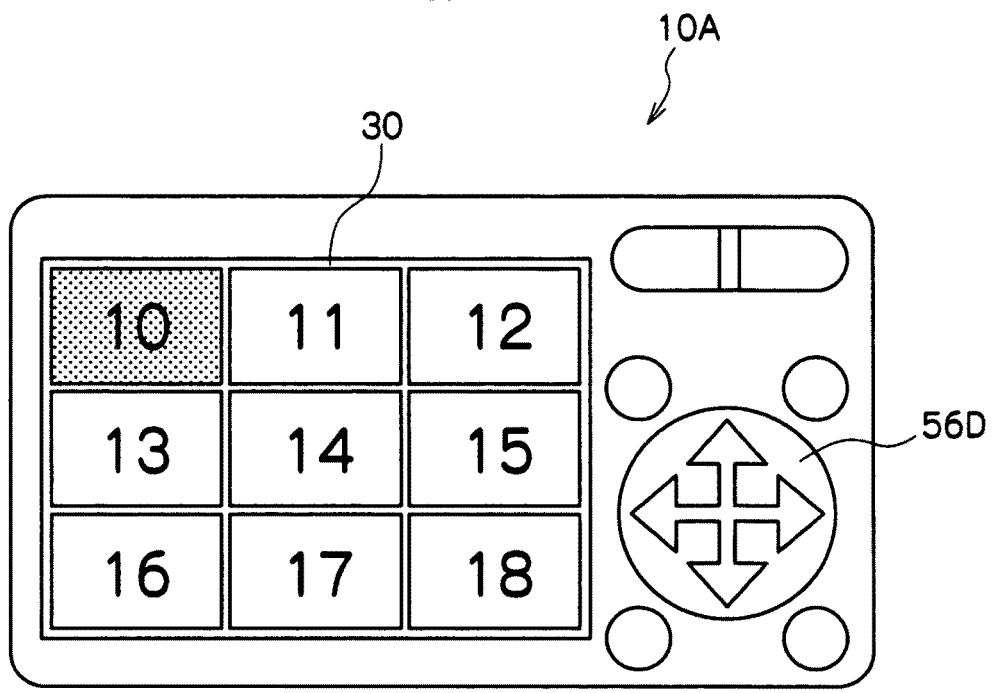
FIG. 8 is a schematic diagram showing yet another example of a list display in the digital camera of the first exemplary embodiment.

As an example for this case, items of image information having the image numbers of "1" to "20" may be recorded in the recording medium 42A in ascending order beginning from the image information having the image number "1", and the sequential display may be started beginning from the image information having the image number "1" and the sequential display may be stopped at a time when the image represented by the image information having the image number "10" is being displayed. In this example, as shown in FIG. 8, the CPU 32 may cause the LCD 30 to list-display, in a tiled layout, in nine sections formed by equally trisecting the vertical side and the horizontal side of the display region of the LCD 30, thumbnail images of the images represented by the items of image information having the image numbers of "10" to "18". The imaged may be list up in ascending order of the image numbers from the top left section (the hatched region in FIG. 8) to the bottom right section of the display region of the LCD 30 and one image may be displayed in each one of the sections.

Further, the images within the predetermined range may also be a second predetermined number of images among the display targets in the sequential display in progress, which are selected consecutively in reverse order of display from the reference image, and a third predetermined number of images which are selected consecutively in order of display from the reference image. In this case, even if the time of the designation of a desired image is either earlier or later the time when that image is displayed, the desired image can be selected exactly.

In this case, the CPU 32 may also be configured to control the LCD 30 to perform the list display by displaying, in a tiled layout, the images within the predetermined range (i.e., both the second predetermined number of images among the display targets in the sequential display in progress, which are selected consecutively in reverse order of display from the reference image, and the third predetermined number of images which are selected consecutively in order of display from the reference image). Thus, a desired image can be selected even more exactly.

Figure 9:
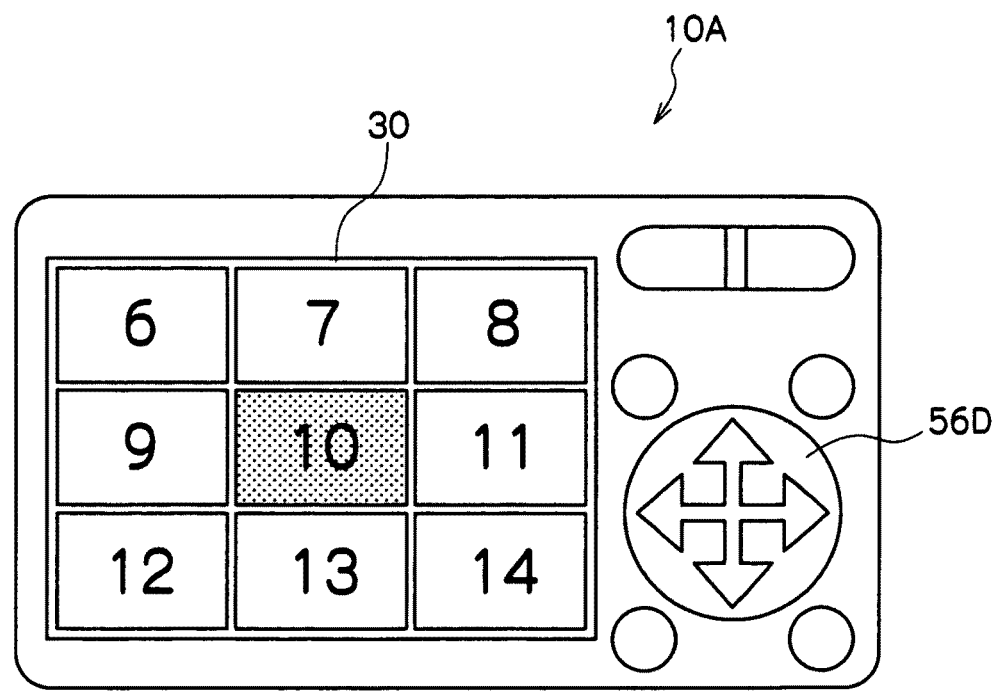
FIG. 9 is a schematic diagram showing further yet another example of a list display in the digital camera of the first exemplary embodiment.

As an example for this case, items of image information having the image numbers of "1" to "20" may be recorded in the recording medium 42A in ascending order beginning from the image information of image number "1" and the sequential display may be started beginning from the image information having the image number "1" and the sequential display may be stopped at a time when the image represented by the image information having the image number "10" is being displayed. In this example, as shown in FIG. 9, the CPU 32 then causes the LCD 30 to list-display, in a tiled layout in nine sections that are formed by equally trisecting the vertical side and the horizontal side of the display region of the LCD 30, thumbnail images of the images represented by the items of image information having the image numbers of "6" to "14". The images may be lined up in ascending order of the image numbers from the top left section to the bottom right section of the display region of the LCD 30 and one image may be displayed in each one of the sections.

In this example, four images having the image numbers of "6" to "9" correspond to the second predetermined number of images and another four images having the image numbers of "11" to "14" correspond to the third predetermined number of images.

Further, in the first exemplary embodiment, a case has been described in which the CPU 32 controls the LCD 30 such that, when the number of the images of the display targets is less than the predetermined number, the LCD 30 enlarges the images of the display targets utilizing an empty region within the predetermined region. However, the exemplary invention is not limited to this. The CPU 32 may also control the LCD 30 to perform the list display by displaying, within the predetermined region in the display region of the LCD 30, a predetermined number of images of the display targets and, when the number of the images of the display targets is less than the predetermined number, the LCD 30 does not display the images at the empty region within the predetermined region. In this case, a desired image can be also selected even more exactly.

Figure 10:
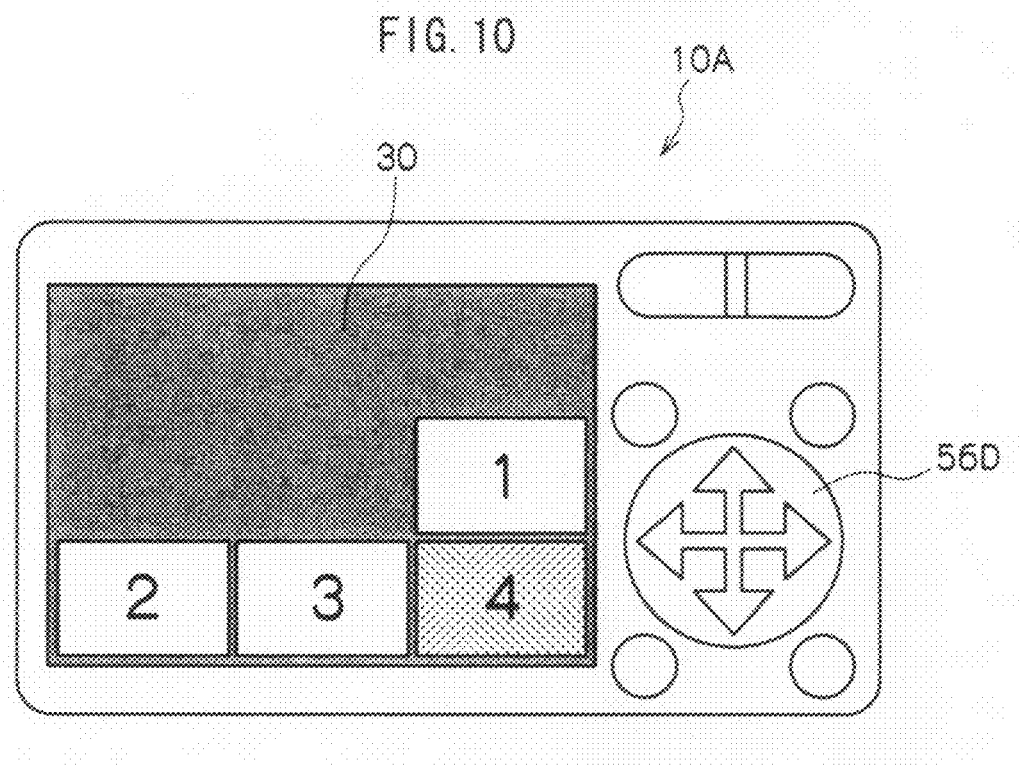
FIG. 10 is a schematic diagram showing further yet another example of a list display in the digital camera of the first exemplary embodiment.

As an example in this case, items of image information having the image numbers of "1" to "20" may be recorded in the recording medium 42A in ascending order beginning from the image information having the image number "1" and the sequential display may be started from the image information having the image number "1" and the sequential display may be stopped at a time when the image represented by the image information having the image number "4" is being displayed. In this example, as shown in FIG. 10, the CPU 32 then causes the LCD 30 to display only the images represented by the items of image information having the image numbers of "1" to "4" in the sizes of the aforementioned sections.

Second Exemplary Embodiment

In a second embodiment, a case will be described in which the sequential display that is described in the first exemplary embodiment is performed in a manner such that the plural images of the display targets are displayed by frame advance, in a predetermined order.

Firstly, a configuration of a digital camera 10B of the second exemplary embodiment will be described with reference to FIG. 11. The same reference numerals will be given to the components in FIG. 11 that are the same as those in FIG. 1 and descriptions of those same components will be omitted.

Figure 11:
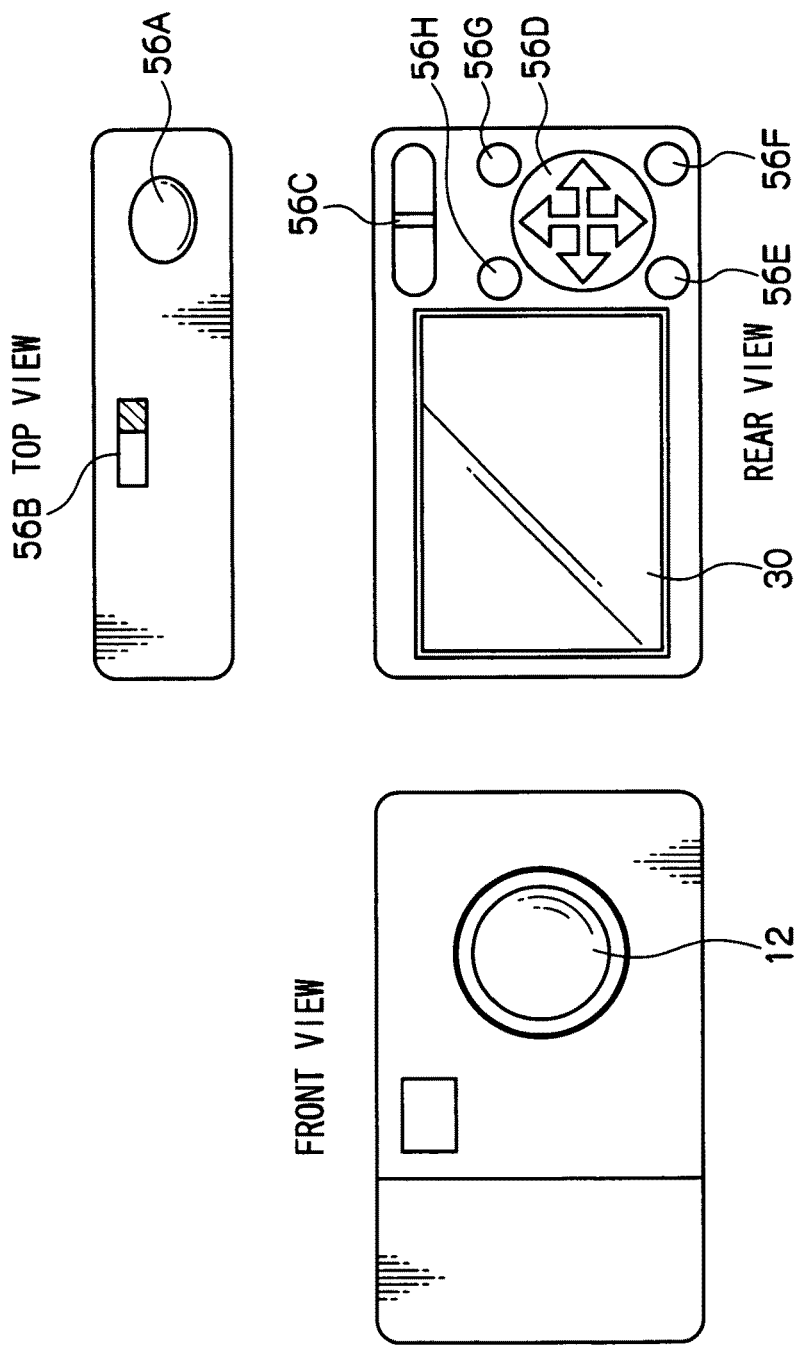
FIG. 11 is an appearance diagram showing an appearance of a digital camera of a second exemplary embodiment.

As shown in FIG. 11, a list display mode key 56H, which is pressed for switching from the playback mode to a list display mode in which a list display of plural images is performed, is disposed on the rear surface of the digital camera 10B of the second exemplary embodiment.

The list display mode key 56H is connected to the CPU 32, and the CPU 32 can constantly recognize the operating state of the list display mode key 56H.

In the digital camera 10B of the second exemplary embodiment, during the list display mode, plural sections are defined in advance with respect to the display region of the LCD 30, and each one of the plural images of the targets of the sequential display are respectively displayed in each one of the sections.

Further, in the digital camera 10B of the second exemplary embodiment, when the start instruction which is described in the first embodiment is received by the operation section 56 during the list display mode, the CPU 32 performs high-speed frame advance processing that causes the LCD 30 to perform the frame advance sequential display of the plural images that are the display targets in a predetermined order.

Next, the action of the digital camera 10B will be described with reference to FIG. 12. Here, in order to avoid confusion, a case will be described in which, during the list display mode, plural images having sequential image numbers are list-displayed on the LCD 30 and items of image information representing the plural images having sequential image numbers are recorded in the recording medium 42A.

Figure 12:
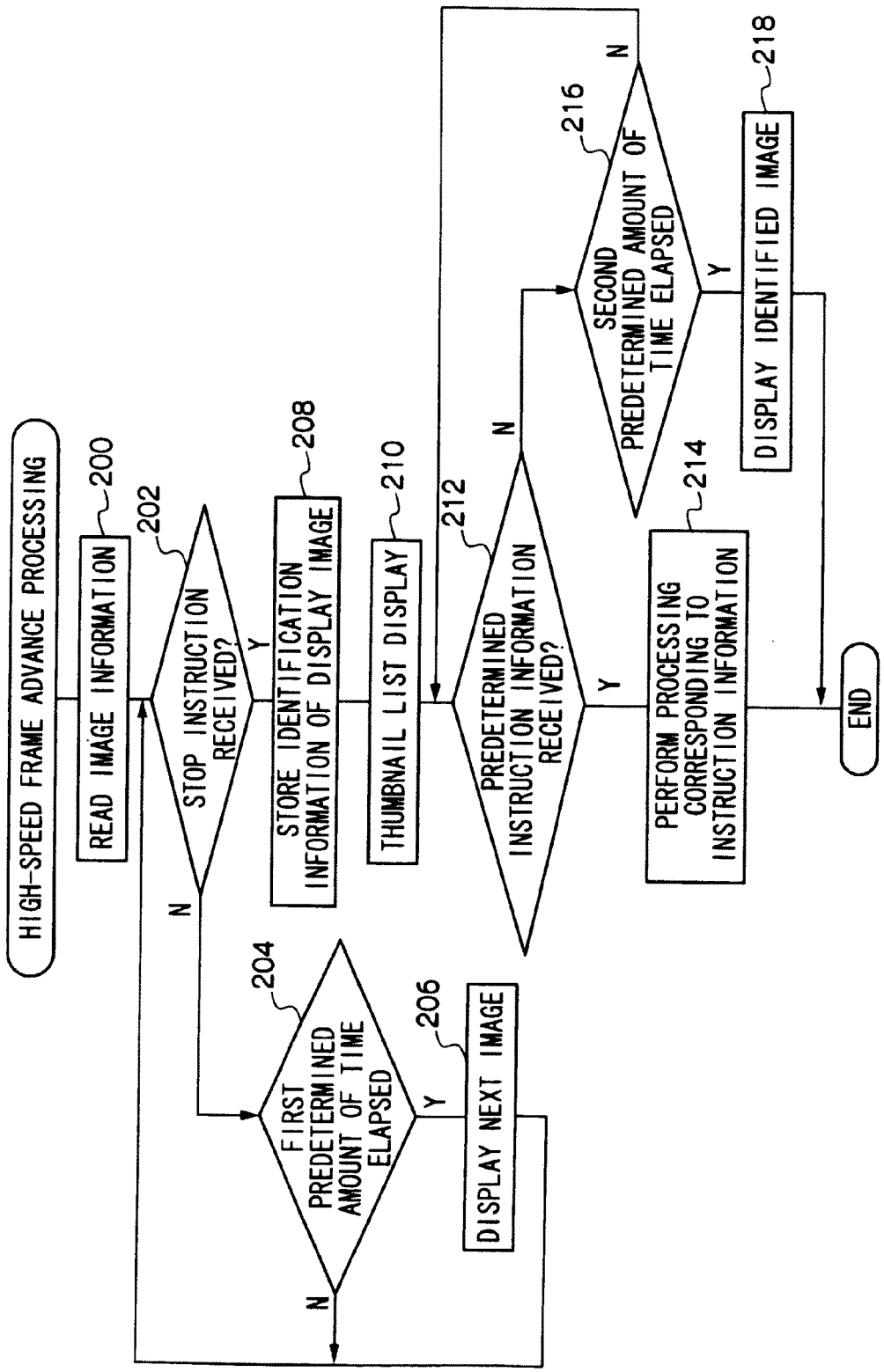
FIG. 12 is a flowchart showing a flow of processing of a high-speed frame advance processing program of the second exemplary embodiment.

FIG. 12 is a flowchart showing a flow of processing of a high-speed frame advance processing program of the second exemplary embodiment that is executed by the CPU 32 of the digital camera 10B in response to the start instruction. This program is stored in advance in a predetermined region of the second memory 40.

In step 200 of FIG. 12, all of the items of image information that are recorded in the recording medium 42A are read out. In the next step 202, it is determined whether or not the stop instruction that is described in the first exemplary embodiment is received by the operation section 56. When the determination is affirmative, then the step moves to step 208. When the determination is negative, then the step moves to step 204.

In step 204, it is determined whether or not the first predetermined amount of time which is described in the first exemplary embodiment has elapsed after the processing of step 202 is performed. When the determination is affirmative, then the step moves to step 206. When the determination is negative, then the step returns to step 202.

In step 206, the LCD 30 displays plural images having sequential image numbers and a next image having the image number subsequent to the plural images that are currently being displayed is displayed while one of the currently displayed plural images is pushed out from the display region. Thereafter, the flow returns to step 202.

Here, in the digital camera 10B of the second exemplary embodiment, when the processing of step 202 to step 206 is repeatedly performed, a number of images corresponding to the number of the sections are displayed sequentially as a group (i.e., in frame advance manner) at the LCD 30.

That is, in correspondence to the predetermined display order of the plural images of the display targets of the sequential display, display positions of the plural images when the images are displayed are determined in advance with respect to each of the sections, and when the sequential display is to be performed, the CPU 32 controls the LCD 30 to sequentially display, in the display order, each of the images in each of the display regions corresponding to the respective display positions. As a result, the images of the display targets are displayed in each of the sections such that the images are essentially passed through the display region as a whole.

In the digital camera 10B of the second exemplary embodiment, in the processing of step 206, the LCD 30 is caused to display, in nine sections that are respectively formed by equally trisecting the vertical side and the horizontal side of the display region of the LCD 30, the images of the display targets one-by-one in ascending order of image number along a substantially inverted S line (in zigzag form) from the top left section to the bottom right section of the display region of the LCD 30.

Figure 13A:
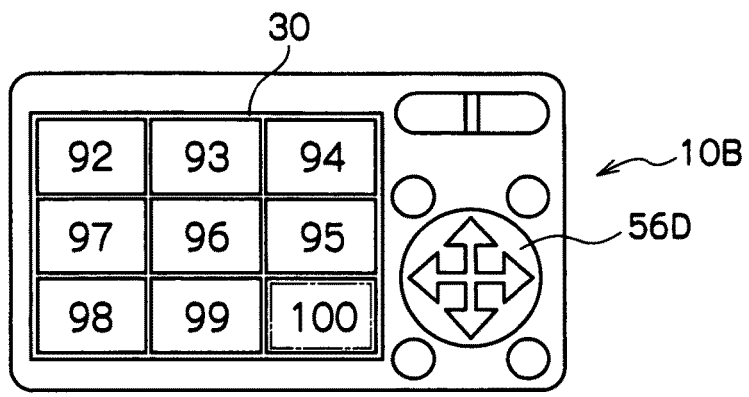
FIG. 13A to FIG. 13C are schematic diagrams showing an example of a sequential display in the digital camera of the second exemplary embodiment.

For example, items of image information having the image numbers of "1" to "100" may be recorded in the recording medium 42A in ascending order beginning from the image information having the image number "1" and the images having the image numbers of "92" to "100" are list-displayed on the LCD 30 as shown in FIG. 13A due to the list display mode being set. In this case, when the processing of step 202 to step 206 is repeatedly executed due to a user continuously pressing the arrow key indicating the right direction of the cross cursor button 56D, then the display state of the LCD 30 transitions in the order of FIG. 13A to FIG. 13B, and FIG. 13B to FIG. 13C.

Further, nine images having sequential image numbers among the images represented by the items of image information having the image numbers of "1" to "100" are displayed in frame advance manner in the image number order at the LCD 30 until the arrow key indicating the right direction of the cross cursor button 56D is released.

Figure 13B:
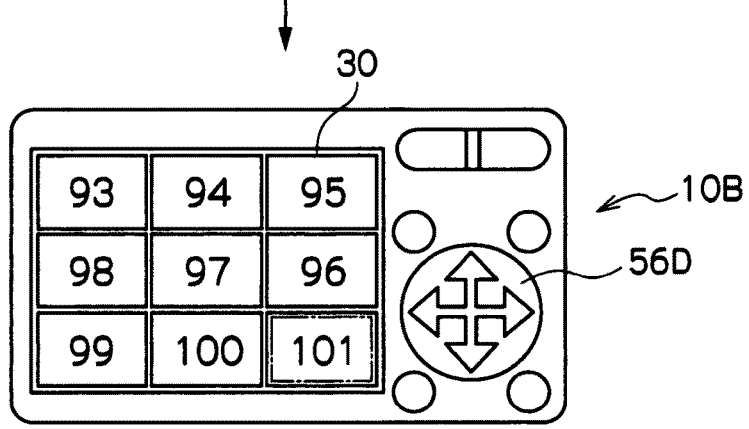
Figure 13C:
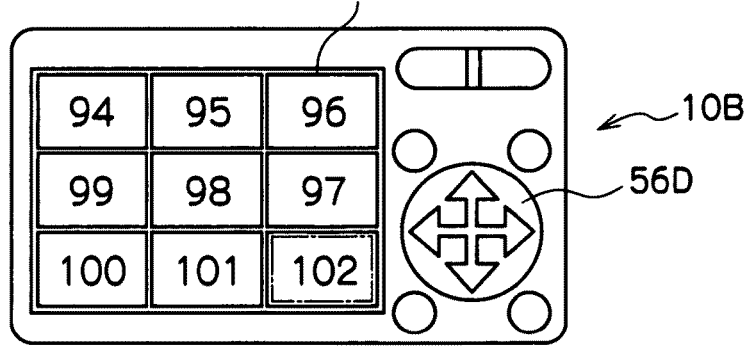

Further, in the digital camera 10B of the second exemplary embodiment, as shown in FIG. 13A to FIG. 13C, a selection frame (indicated by a one-dotted chain line in FIG. 13A to FIG. 13C) is fixedly displayed in the bottom right section of the display region of the LCD 30, and when the user presses the execution key 56F, the image selected by the selection frame at that time is enlarged and displayed in the entire display region of the LCD 30.

In step 208, information (here, the image number) for identifying the image that is currently being displayed on the LCD 30 is stored in the second memory 40. In the next step 210, the LCD 30 performs the list display of the images represented by the items of image information that are read by the processing of step 200 by reducing the images into the size of the section, in a unit of the number of sections and, Thereafter, the step moves to step 212.

In the digital camera 10B of the second exemplary embodiment, for example, items of image information having the image numbers of "1" to "100" may be recorded in the recording medium 42A and the sequential display is stopped during the list display mode when the LCD 30 is in a display state as shown in FIG. 13A. In this case, in the processing of step 210, as shown in FIG. 14, the LCD 30 then performs the list display of the images represented by the items of image information having the image numbers of "20" to "100", in a unit of the number of the sections.

Figure 14:
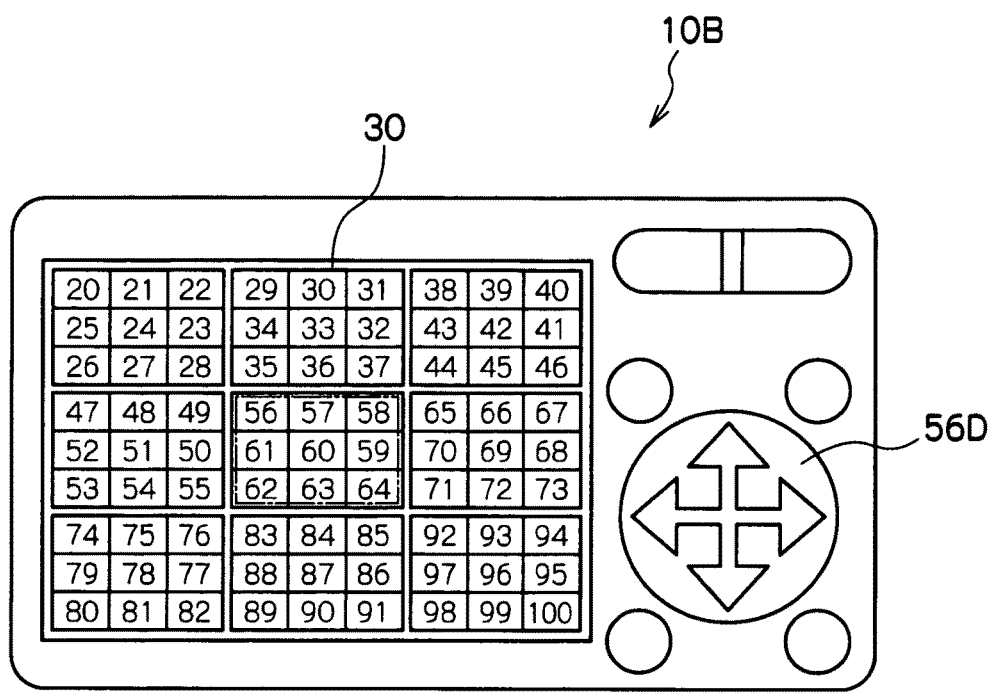
FIG. 14 is a schematic diagram showing an example of a list display in the digital camera of the second exemplary embodiment.

Although the numbers in the display region of the LCD 30 shown in FIG. 14 represent the image numbers, that the image numbers will not be actually displayed.

In the digital camera 10B of the second exemplary embodiment, when the images are list-displayed in the processing of step 210, a user may select any one of the sections in which the images are displayed, and a selection frame (indicated by a one-dotted chain line in FIG. 14) is displayed in a position of the section of the LCD 30 that is selected by the user. This selection frame can be used as the same way as that of the selection frame that is described in the first exemplary embodiment.

In step 212, it is determined whether or not predetermined instruction information (instruction) is received. When the determination is affirmative, then the step moves to step 214. When the determination is negative, then the step moves to step 216.

In step 214, processing corresponding to the instruction that is received in the processing of step 212 is performed. Thereafter, the high-speed frame advance processing program of the second exemplary embodiment ends. For examples of the processing of step 214, the processing same as the processing that is described for step 116 of the high-speed frame advance processing program of the first exemplary embodiment can be included.

In step 216, it is determined whether or not the second predetermined amount of time that is described in the first exemplary embodiment has elapsed after the list display has been performed in the processing of step 210. When the determination is affirmative, then the step moves to step 218. When the determination is negative, then the step returns to step 212.

In step 218, the LCD 30 displays the images identified by the image number that is stored in the second memory in the processing of step 208 such that the display state of the LCD 30 returns to state when the stop instruction was received by the operation section 56. Thereafter, the high-speed frame advance processing program of the second exemplary embodiment ends.

In the second exemplary embodiment, step 202 corresponds to the reception step of the present invention, step 202 to step 206 correspond to the display step of the present invention, and step 210 corresponds to the control step of the present invention.

As described above, according to the second exemplary embodiment, the LCD 30 performs the sequential display in frame advance manner, in a predetermined order (here, in the image number order), the plural images of the display targets. Thus, a desired image can be selected even more quickly.

Although the present invention has been described using the exemplary embodiments, the scope of the present invention is not limited to the extent described in the exemplary embodiments. Various modifications or improvements can be applied to the exemplary embodiments unless it does not depart from the gist of the invention, and embodiments to which these modifications or improvements are applied will be also included in the scope of the present invention.

The exemplary embodiments are not intended to limit the inventions recited in the claims, and it is not necessary to provide all combinations of the features described in the exemplary embodiments to implement the invention. Various stages of the present invention are included in the exemplary embodiments, and various implementations of the invention can be extracted from the combinations of the plural components that are disclosed according to the situation. Even if several components are omitted from the components described in the exemplary embodiments, such configuration can be fall within the scope of the invention as long as the same effects can be obtained.

For example, in each of the exemplary embodiments, a case has been described in which the display region of the LCD 30 is divided into nine sections when performing the list display. However, the present invention is not limited to this. For example, the display region of the LCD 30 may be divided into sixteen sections or twenty-five sections or the like. In this manner, in performing the list display, the number of the sections the display region of the LCD 30 is divided into may be appropriately alterable.

Further, in each of the exemplary embodiments, a case has been described in which the sequential display is started by continuous pressing of the arrow key indicating the left direction or the right direction of the cross cursor button 56D for a period equal to or greater than a predetermined amount of time, and in which the sequential display is stopped by releasing the arrow key of the cross cursor button 56D. However, the present invention is not limited to this. For example, the sequential display may be started by performing a predetermined operation with respect to a predetermined first operation key and the sequential display may be stopped by performing a predetermined operation with respect to a predetermined second operation key. Further, the sequential display may be started by a single pressing of a predetermined push button, and the sequential display may be stopped by one more single pressing of that push button. In this manner, any form may be adopted for the start instruction for starting the sequential display and the stop instruction for stopping the sequential display.

In each of the exemplary embodiments, a case has been described in which, at the start of the sequential displaying, all of the items of image information that are recorded in the recording medium 42A are read and then the sequential display is performed. However, the invention is not limited thereto. For example, the sequential display may be performed by reading each of the items of image information one by one from the recording medium 42A during the displaying.

In each of the exemplary embodiments, images are identified using the image numbers. However, the present invention is not limited to this. The images may be identified by any type of information as long as the images can be identified with that information.

The configurations of the digital cameras 10A and 10B (see FIG. 1, FIG. 2 and FIG. 11) that are described in each of the exemplary embodiments are examples, and the configurations thereof can be modified in response to the situation unless it does not depart from the gist of the present invention.

The flows of processing of each of the processing programs (see FIG. 3 and FIG. 12) that are described in each of the exemplary embodiments are also examples, and therefore, unnecessary steps can be omitted, new steps can be added, and the processing order can be changed unless it does not depart from the gist of the present invention.

In each of the exemplary embodiments, a case has been described in which the present invention is applied to a digital camera, but the present invention is not limited to this. It can be appreciated that the present invention can be applied to any device as long as the device includes a function of performing sequential display of plural images.

What is claimed is:

1. An image display device, comprising:
   a storage unit in which a plurality of items of image information is stored;
   a display unit that performs sequential display in which a plurality of still images represented by the plurality of items of image information are displayed sequentially in a predetermined order;
   a reception unit that receives a stop instruction for stopping the sequential display; and
   a controller that controls the display unit such that, when the stop instruction is received by the reception unit during performance of the sequential display, the display unit stops the sequential display of the plurality of still images, and based on the stop instruction the display unit performs a list display comprising two or more still images, the two or more still images being selected from the plurality of still images, using as a reference a still image among the plurality of still images, which has been displayed at a time when the stop instruction is received,
   wherein the two or more still images have an identical size to equally divide an entirety of the display unit, and
   wherein, if the reception unit does not receive the stop instruction within a predetermined period of time after performing the list display, the display unit displays the still image used as the reference.

2. The image display device of claim 1, wherein the still images comprise a predetermined number of still images among display target images in the sequential display in progress, selected consecutively in a reverse order of display from the reference image.

3. The image display device of claim 1, wherein the still images comprise a predetermined number of still images among display target images in the sequential display in progress, selected consecutively in an order of display from the reference image.

4. The image display device of claim 1, wherein the still images include a second predetermined number and a third predetermined number of still images among display target images in the sequential display in progress, the second predetermined number of still images being selected consecutively in a reverse order of display from the reference image and the third predetermined number of still images selected consecutively in an order of display from the reference image.

5. The image display device of claim 1, wherein the controller controls the display unit such that the display unit performs the list display by displaying, within a predetermined region within a display region of the display unit, a predetermined number of still images that comprise display targets, and such that, when a number of the display target images is less than the predetermined number, the display unit enlarges the display target images and displays them utilizing an empty region within the predetermined region.

6. The image display device of claim 1, wherein the controller controls the display unit such that the display unit performs the list display by displaying, within a predetermined region within a display region of the display unit, a predetermined number of still images that comprise display targets, and such that, when a number of the display target images is less than the predetermined number, the display unit displays no image on an empty region within the predetermined region.

7. The image display device of claim 1, wherein the reception unit further receives a predetermined instruction, and
   wherein the controller controls the display unit such that, when the predetermined instruction has not been received by the reception unit within a predetermined amount of time after the display unit performs the list display, the display unit returns a display state of the display unit to a state in which the stop instruction was received by the reception unit.

8. The image display device of claim 1, wherein the reception unit further receives, when at least one still image is being displayed by the display unit, a start instruction for starting the sequential display in the predetermined order beginning with the at least one still image, and
   wherein the controller controls the display unit such that the display unit performs the sequential display when the start instruction is received by the reception unit.

9. An image capture device comprising the image display device of claim 1.

10. The image display device of claim 1, wherein the display unit stops the sequential display of the still images and performs the list display of a certain number of the still images in response to a same instruction, which comprises the stop instruction, received during the sequential display.

11. The image display device of claim 1, wherein the still images are generated before the reception unit receives the stop instruction.

12. A method of operating an image display device, the method comprising:

storing a plurality of items of image information respectively representing a plurality of still images on a computer;

sequentially displaying the plurality of still images in a predetermined order;

receiving a stop instruction for stopping the sequential display; and controlling the image display device such that, when the stop instruction is received while the sequential display is being performed, the image display device stops the sequential display of the plurality of still images, and based on the stop instruction the image display device performs a list display comprising two or more still images, the two or more still images being selected from the plurality of still images, using as a reference a still image among the plurality of still images, which has been displayed when the stop instruction is received, wherein the two or more still images have an identical size to equally divide an entirety of a display unit that displays the still images, and wherein, if the stop instruction is not received within a predetermined period of time after performing the list display, the display unit displays the still image used as the reference.

13. The method of claim 12, wherein the image display device stops the sequential display of the still images and performs the list display of a certain number of the still images in response to a same instruction, which comprises the stop instruction, received during the sequential display.

14. The method of claim 12, wherein the still images are generated before the receiving the stop instruction.

15. A non-transitory computer-readable storage medium storing a program for causing a computer to execute an image displaying processing in an image display device, the processing comprising:

storing a plurality of items of image information respectively representing a plurality of still images;

sequentially displaying the plurality of still images in a predetermined order;

receiving a stop instruction for stopping the sequential display; and controlling such that, when the stop instruction is received while the sequential display is being performed, the sequential display of the plurality of still images is stopped, and based on the stop instruction a list display comprising two or more still images, the two or more still images being selected from the plurality of still images, using as a reference a still image among the plurality of still images, which has been displayed when the stop instruction is received, wherein the two or more still images have an identical size to equally divide an entirety of a display unit that displays the still images, and wherein if the stop instruction is not received within a predetermined period of time after performing the list display, the display unit displays the still image used as the reference.

16. The non-transitory computer-readable storage medium of claim 15, wherein the sequential display of the still images is stopped and the list display of a certain number of the still images is performed in response to a same instruction, which comprises the stop instruction, received during the sequential display.

17. The non-transitory computer-readable storage medium of claim 15, wherein the still images are generated before the receiving the stop instruction.

* * * * *